United States Patent
Nagata et al.

(10) Patent No.: US 12,509,125 B2
(45) Date of Patent: Dec. 30, 2025

(54) OPERATION MANAGEMENT APPARATUS

(71) Applicant: TOYOTA JIDOSHA KABUSHIKI KAISHA, Toyota (JP)

(72) Inventors: Yu Nagata, Chofu (JP); Ibuki Shimada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 18/380,688

(22) Filed: Oct. 17, 2023

(65) Prior Publication Data

US 2024/0132114 A1 Apr. 25, 2024
US 2024/0227865 A9 Jul. 11, 2024

(30) Foreign Application Priority Data

Oct. 21, 2022 (JP) ................................. 2022-169481

(51) Int. Cl.
*B60W 60/00* (2020.01)
*G07C 5/00* (2006.01)

(52) U.S. Cl.
CPC ......... *B60W 60/0053* (2020.02); *G07C 5/008* (2013.01); *B60W 2556/45* (2020.02)

(58) Field of Classification Search
None
See application file for complete search history.

(56) References Cited

U.S. PATENT DOCUMENTS

2019/0084563 A1* 3/2019 Sogabe ................. B60W 40/04
2023/0063930 A1 3/2023 Ichida et al.
2024/0126273 A1* 4/2024 Pschierer ............... G05D 1/106

FOREIGN PATENT DOCUMENTS

JP 2012033025 A 2/2012
JP 2021-174413 A 11/2021

OTHER PUBLICATIONS

Machine translation of JP 2012033025 A (Year: 2012).*

* cited by examiner

*Primary Examiner* — Anne Marie Antonucci
*Assistant Examiner* — Kyle S Park
(74) *Attorney, Agent, or Firm* — Dinsmore & Shohl LLP

(57) ABSTRACT

An operation management apparatus includes a controller configured to receive, via a communication interface, first data to be transmitted at first time intervals and second data to be transmitted at second time intervals longer than the first time intervals from the vehicle, the first data indicating an operational state of the vehicle at a time of transmission of the first data, the second data indicating operational states of the vehicle at multiple times up to a time of transmission of the second data, generate, with reference to the received first data, third data indicating a time at which the vehicle has transitioned to each of a series of operational states, and complement the third data with reference to the received second data upon determining that the received first data has missing data indicating at least one of the series of operational states.

3 Claims, 6 Drawing Sheets

OPERATION MANAGEMENT APPARATUS

CROSS-REFERENCE TO RELATED APPLICATION

This application claims priority to Japanese Patent Application No. 2022-169481 filed on Oct. 21, 2022, the entire contents of which are incorporated herein by reference.

TECHNICAL FIELD

The present disclosure relates to an operation management apparatus.

BACKGROUND

Patent Literature (PTL) 1 discloses an apparatus that changes data to be recorded according to a driving mode of an automated driving ECU. The term "ECU" is an abbreviation of electronic control unit.

CITATION LIST

Patent Literature

PTL 1: JP 2021-174413 A

SUMMARY

Operations of an automated driving bus may be managed remotely with reference to data obtained from an automated driving ECU. To reduce the communication load, it is desirable to limit the frequency of data acquisition from the automated driving bus. However, there is a risk that necessary data may be missing and the operations of the automated driving bus may not be completely managed.

It would be helpful to enable sufficient remote management of operations of vehicles while reducing the communication load.

An operation management apparatus according to the present disclosure includes:

a communication interface configured to communicate with a vehicle to be operated with a passenger on board; and a controller configured to:
  receive, via the communication interface, first data to be transmitted at first time intervals and second data to be transmitted at second time intervals longer than the first time intervals from the vehicle, the first data indicating an operational state of the vehicle at a time of transmission of the first data, the second data indicating operational states of the vehicle at multiple times up to a time of transmission of the second data;
  generate, with reference to the received first data, third data indicating a time at which the vehicle has transitioned to each of a series of operational states; and
  complement the third data with reference to the received second data upon determining that the received first data has missing data indicating at least one of the series of operational states.

According to the present disclosure, operations of vehicles can be sufficiently managed remotely while reducing the communication load.

DETAILED DESCRIPTION

Figure 1:
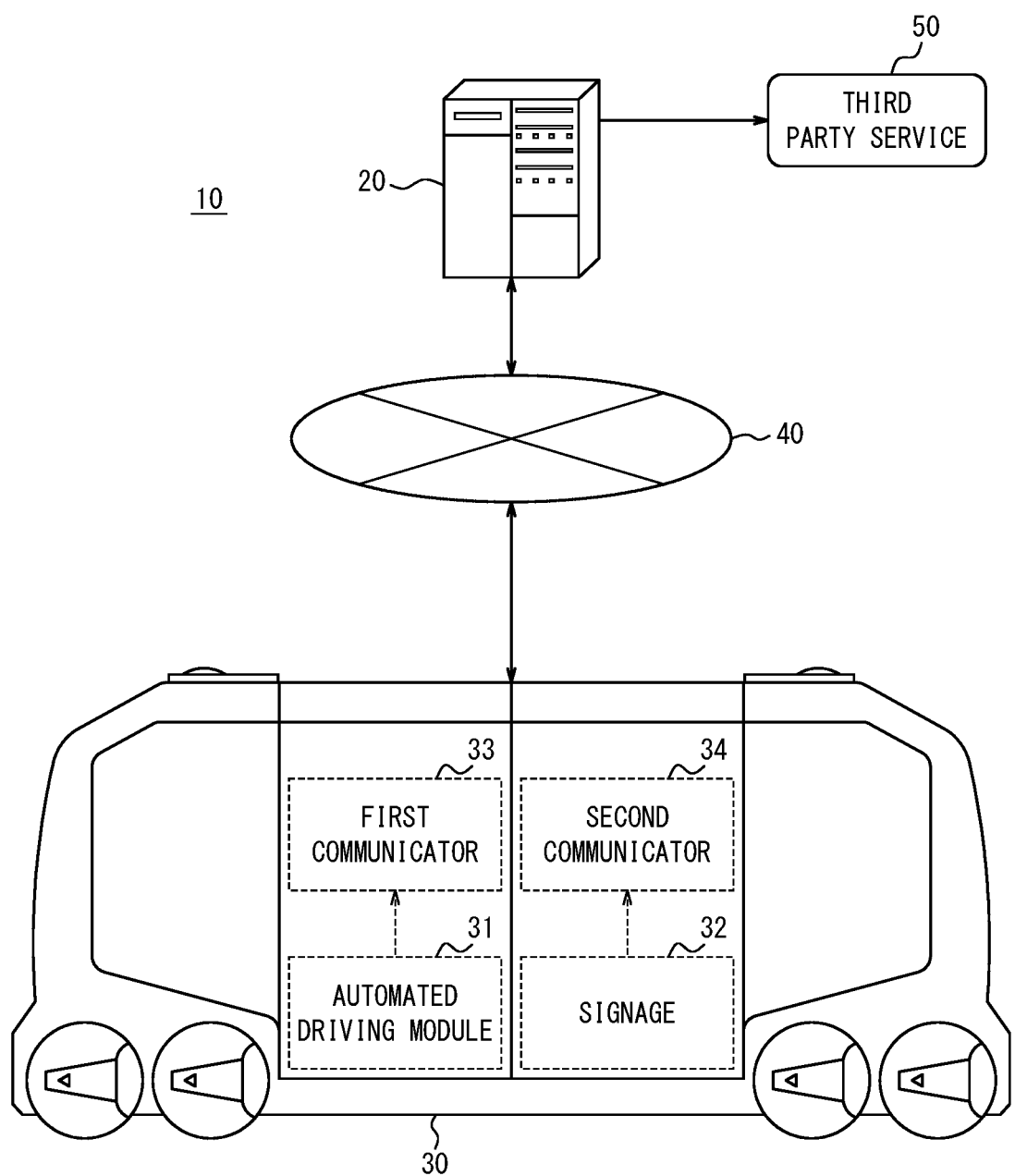
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes an operation management apparatus 20 and a vehicle 30. The operation management apparatus 20 can communicate with the vehicle 30 via a network 40.

The operation management apparatus 20 is installed in a facility such as a data center or an operation management center, and is operated by an operator that manages operations of the vehicle 30. The operation management apparatus 20 is a computer such as a server that belongs to a cloud computing system or another type of computing system.

The vehicle 30 is to be operated with passengers on board. The vehicle 30 is to be operated as a bus, for example, a route bus. The vehicle 30 is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 30 may be an AV or may be driven by a driver, either of which may be freely selected in the present embodiment. The term "AV" is an abbreviation of autonomous vehicle. The vehicle 30 may be a MaaS-dedicated vehicle. The term "MaaS" is an abbreviation of Mobility as a Service.

The vehicle 30 is equipped with an automated driving module 31, a signage 32, a first communicator 33, and a second communicator 34.

The automated driving module 31 is, for example, an ECU. The automated driving module 31 controls the automated driving of the vehicle 30. For example, when an operation start time approaches, the automated driving module 31 receives an operation schedule transmitted from the operation management apparatus 20 via the first communicator 33. The operation schedule specifies a time at which the vehicle 30 departs a garage, a time at which the vehicle 30 arrives at a first stop, a time at which the vehicle 30 departs the first stop, a time at which the vehicle 30 arrives at a last stop, a time at which the vehicle 30 departs the last stop, and a time at which the vehicle 30 arrives at the garage. The operation schedule may further specify times at which the vehicle 30 arrives at one or more other stops and times at which the vehicle 30 departs from the one or more other stops. The automated driving module 31 moves the vehicle 30 in automated driving according to the received operation schedule.

The signage 32 is, for example, an electronic billboard inside the vehicle 30, an automatic audio speaker inside the vehicle 30, or an electronic billboard outside the vehicle 30. The signage 32 presents information to the inside or outside of the vehicle 30. For example, when the vehicle 30 is approaching a stop, the signage 32 notifies passengers or others that the vehicle 30 is arriving the stop. Alternatively, the signage 32 may display the location of the vehicle 30 on a route map in real time.

Each of the first and second communicators 33 and 34 is a communicator compatible with a mobile communication standard such as LTE, the 4G standard, or the 5G standard. The term "LTE" is an abbreviation of Long Term Evolution. The term "4G" is an abbreviation of 4th generation. The term "5G" is an abbreviation of 5th generation. The first communicator 33 is used for communication between the automated driving module 31 and the operation management apparatus 20. The second communicator 34 is used for communication between the signage 32 and the operation management apparatus 20.

The network 40 includes the Internet, at least one WAN, at least one MAN, or any combination thereof. The term "WAN" is an abbreviation of wide area network. The term "MAN" is an abbreviation of metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

The operation management apparatus 20 receives first data D1 and second data D2 from the vehicle 30. The first data D1 is data to be transmitted at first time intervals T1 and indicating an operational state of the vehicle 30 at the time of transmission of the first data D1. The second data D2 is data to be transmitted at second time intervals T2, which are longer than the first time intervals T1, and indicating operational states of the vehicle 30 at multiple times up to the time of transmission of the second data D2. The operation management apparatus 20 generates third data D3 with reference to the received first data D1. The third data D3 is data indicating a time at which the vehicle 30 has transitioned to each of a "series of operational states". In a case in which the operation management apparatus 20 determines that the received first data D1 has missing data indicating at least one of the "series of operational states", the operation management apparatus 20 complements the third data D3 with reference to the received second data D2.

According to the present embodiment, even when the first data D1 has missing data necessary for operation management, data for operation management can be complemented using the second data D2 received later. Therefore, even when the first data D1 is not transmitted at a high frequency, the data necessary for operation management can be secured. In other words, operations of the vehicle 30 can be sufficiently managed remotely while reducing the communication load.

In the present embodiment, the operation management apparatus 20 acquires the first data D1 from the automated driving module 31 via the first communicator 33 and the second data D2 from the signage 32 via the second communicator 34. The first data D1 includes a status number as the latest value indicating the operational state of the vehicle 30. The status number "1" indicates that the operational state of the vehicle 30 is "preparing for arrival". The status number "2" indicates that the operational state of the vehicle 30 is "arrival". The status number "3" indicates that the operational state of the vehicle 30 is "boarding/alighting". The status number "4" indicates that the operational state of the vehicle 30 is "departure". The second data D2 includes multiple combinations of times and status numbers as cumulative data indicating a history of the operational state of the vehicle 30. When a driving mode of the vehicle 30 is an automatic mode, the operation management apparatus 20 adopts the information from the automated driving module 31 as operation performance information. When the first data D1 is missing, or when two or more operational states of the vehicle 30 change in a shorter period of time than a communication frequency of the automated driving module 31, the status number is missing. Therefore, the operation management apparatus 20 complements the operation performance information with the information from the signage 32 by selecting, from the second data D2, the earliest time out of times in combination with the missing status number. For example, in a case in which the status number jumps from "1" to "3" and the status numbers are not consecutive, the earliest time out of times in combination with the missing status number "2" is selected from the second data D2. As a result, not only are times at which the operational state of the vehicle 30 has become "preparing for arrival" and at which the operational state of the vehicle 30 has become "boarding/alighting" identified, but also a time at which the operational state of the vehicle 30 has become "arrival", which is missing in the information from the automated driving module 31, is identified. In other words, it is possible to acquire information on complete operation performance in which the operational state of the vehicle 30 has transitioned from "preparing for arrival" to "boarding/alighting".

When the driving mode of the vehicle 30 is a manual mode, the operation management apparatus 20 may adopt the information from the signage 32 as the operation performance information.

The operation management apparatus 20 may provide information on operation performance to the outside. For example, the operation management apparatus 20 may transmit, via the network 40, the third data D3 to an external server apparatus providing a third party service 50.

Figure 2:
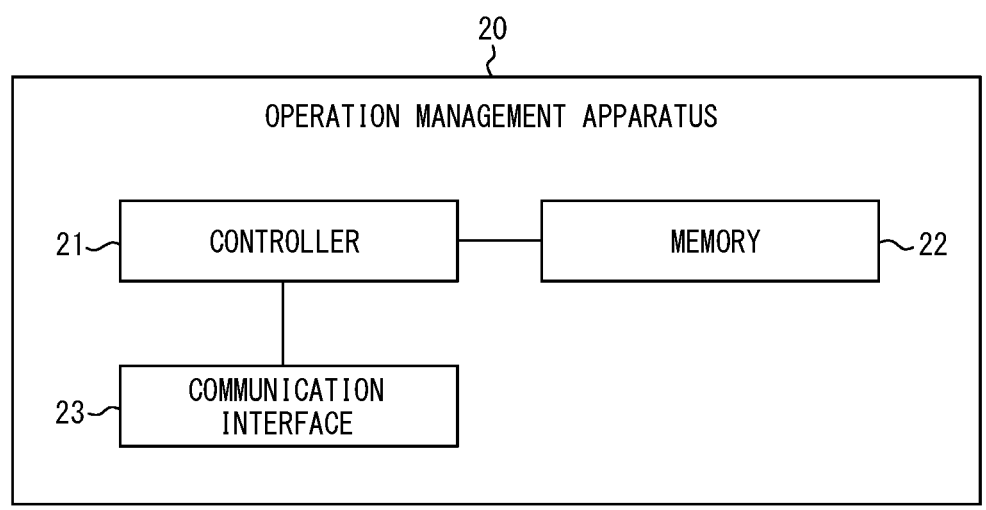
FIG. 2 is a block diagram illustrating a configuration of an operation management apparatus according to the embodiment of the present disclosure.

A configuration of the operation management apparatus 20 according to the present embodiment will be described with reference to FIG. 2.

The operation management apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA"

is an abbreviation of field-programmable gate array. The dedicated circuit is, for example, an ASIC. The term "ASIC" is an abbreviation of application specific integrated circuit. The controller 21 executes processes related to operations of the operation management apparatus 20 while controlling components of the operation management apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used for the operations of the operation management apparatus 20 and data obtained by the operations of the operation management apparatus 20.

The communication interface 23 includes at least one interface for communication. The interface for communication is, for example, an interface compatible with a wired LAN communication standard such as Ethernet® (Ethernet is a registered trademark in Japan, other countries, or both) or a wireless LAN communication standard such as IEEE802.11. The name "IEEE" is an abbreviation of Institute of Electrical and Electronics Engineers. The communication interface 23 communicates with the vehicle 30. In the present embodiment, the communication interface 23 communicates with the first and second communicators 33 and 34, in particular. The communication interface 23 receives data to be used for the operations of the operation management apparatus 20, and transmits data obtained by the operations of the operation management apparatus 20.

The functions of the operation management apparatus 20 are realized by execution of a program according to the present embodiment by a processor serving as the controller 21. That is, the functions of the operation management apparatus 20 are realized by software. The program causes a computer to execute the operations of the operation management apparatus 20, thereby causing the computer to function as the operation management apparatus 20. That is, the computer executes the operations of the operation management apparatus 20 in accordance with the program to thereby function as the operation management apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the operation management apparatus 20 may be realized by a programmable circuit or a dedicated circuit serving as the controller 21. That is, some or all of the functions of the operation management apparatus 20 may be realized by hardware.

Figure 3:
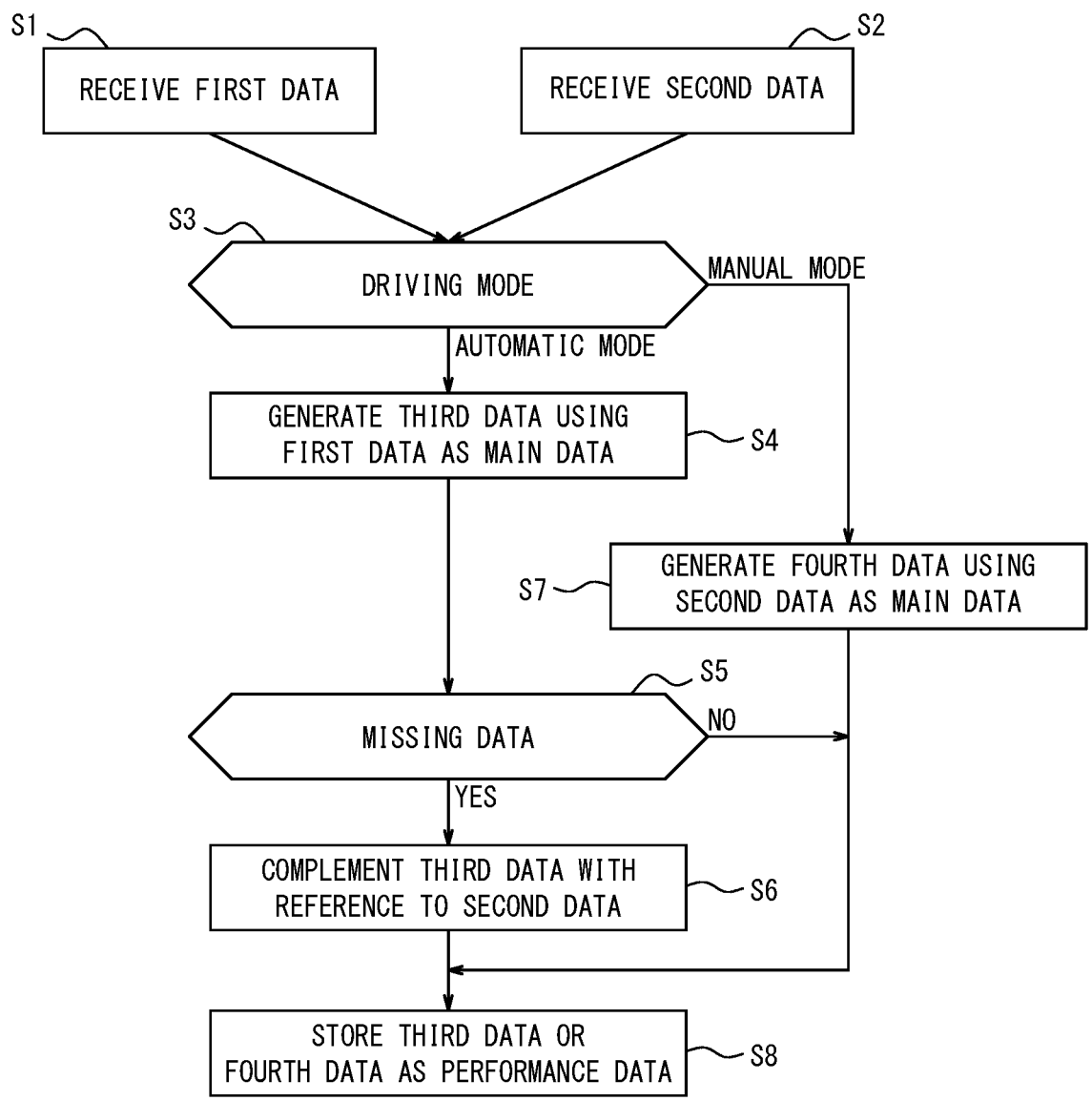
FIG. 3 is a flowchart illustrating operations of the operation management apparatus according to the embodiment of the present disclosure.

Operations of the operation management apparatus 20 according to the present embodiment will be described with reference to FIG. 3. These operations correspond to an operation management method according to the present embodiment.

In step S1, the controller 21 of the operation management apparatus 20 receives first data D1 from the vehicle 30 via the communication interface 23. The first data D1 is data to be transmitted at first time intervals T1 and indicating the operational state of the vehicle 30 at the time of transmission of the first data D1 in one of a "series of operational states". In the present embodiment, the first data D1 is data obtained from the automated driving module 31. Therefore, the controller 21 receives the first data D1 from the first communicator 33 via the communication interface 23.

The process of step S1 is executed each time the first data D1 is transmitted from the first communicator 33. In other words, the process of step S1 is executed at the first time intervals T1 when there is no abnormality in communication.

In step S2, the controller 21 of the operation management apparatus 20 receives second data D2 from the vehicle 30 via the communication interface 23. The second data D2 is data to be transmitted at second time intervals T2, which are longer than the first time intervals T1, and indicating each of the operational states of the vehicle 30 at multiple times up to the time of transmission of the second data D2 in one of "two or more types of operational states", which are fewer than the "series of operational states". In the present embodiment, the second data D2 is data obtained from the signage 32. Therefore, the controller 21 receives the second data D2 from the second communicator 34 via the communication interface 23.

The process of step S2 is executed each time the second data D2 is transmitted from the second communicator 34. In other words, the process of step S2 is executed at the second time intervals T2 when there is no abnormality in communication.

In step S3, the controller 21 of the operation management apparatus 20 determines whether the driving mode of the vehicle 30 is an automatic mode or a manual mode. The automation level of driving in the automatic mode is, for example, any one of Level 3 to Level 5 according to the level classification defined by SAE. The name "SAE" is an abbreviation of Society of Automotive Engineers. Driving may be automated to some extent even in the manual mode. The automation level in manual driving is, for example, any one of Level 0 to Level 2 according to the level classification defined by the SAE. The controller 21 may determine the driving mode of the vehicle 30 by whether the first data D1 is transmitted from the vehicle 30, or by receiving, from the vehicle 30, data notifying the driving mode to the operation management apparatus 20.

The process in step S3 is executed each time the process in step S1 is executed. When it is determined in step S3 that the driving mode of the vehicle 30 is the automatic mode, i.e., the vehicle 30 is operated in automated driving, the process in step S4 is executed. On the other hand, when it is determined in step S3 that the driving mode of the vehicle 30 is the manual mode, i.e., the vehicle 30 is operated in manual driving, the process in step S7 is executed In step S4, the controller 21 of the operation management apparatus 20 generates third data D3 with reference to the first data D1 received in step S1. The third data D3 is data indicating a time at which the vehicle 30 has transitioned to each of the "series of operational states".

In step S5, the controller 21 of the operation management apparatus 20 determines whether the first data D1 received in step S1 has missing data indicating at least one of the "series of operational states".

When it is determined in step S5 that the first data D1 has missing data, the process in step S6 is executed. On the other hand, when it is determined in step S5 that the first data D1 has no missing data, the process in step S8 is executed.

In step S6, the controller 21 of the operation management apparatus 20 complements the third data D3 with reference to the second data D2 received in step S2. In the present embodiment, the controller 21 complements the third data D3 by adding, to the third data D3, data indicating, among the multiple times, the earliest time at which the operational state indicated by the second data D2 received in step S2 corresponds to at least one of the "series of operational states", as a time at which the vehicle 30 has transitioned to the at least one of the "series of operational states". After that, the process in step S8 is executed.

The process in step S6 is executed after the process in step S2 is executed. In other words, the process in step S6 is executed after the processes in steps S3 to S5 have been executed, waiting until data necessary to complement the third data D3 is obtained.

In step S7, the controller 21 of the operation management apparatus 20 generates fourth data D4 with reference to the second data D2 received in step S2. The fourth data D4 is data indicating a time at which the vehicle 30 has transitioned to each of the "two or more types of operational states". After that, the process in step S8 is executed.

The process in step S7 is executed after the process in step S2 is executed. In other words, the process in step S7 is executed after the process in step S3 is executed, waiting until data necessary to generate the fourth data D4 is obtained.

The second data D2 received in step S2 may be data indicating each of the operational states of the vehicle 30 at multiple times in one of the "series of operational states", rather than data indicating each of the operational states of the vehicle 30 at multiple times in one of the "two or more types of operational states". In such a variation, the fourth data D4 generated in step S7 is data indicating a time at which the vehicle 30 has transitioned to each of the "series of operational states".

In step S8, the controller 21 of the operation management apparatus 20 stores the third data D3 generated in step S4, or the third data D3 generated in step S4 and complemented in step S6, or the fourth data D4 generated in step S7 in the memory 22 as performance data D5. The controller 21 may transmit the stored performance data D5 to an external server apparatus providing the third party service 50 via the communication interface 23.

Figure 4:
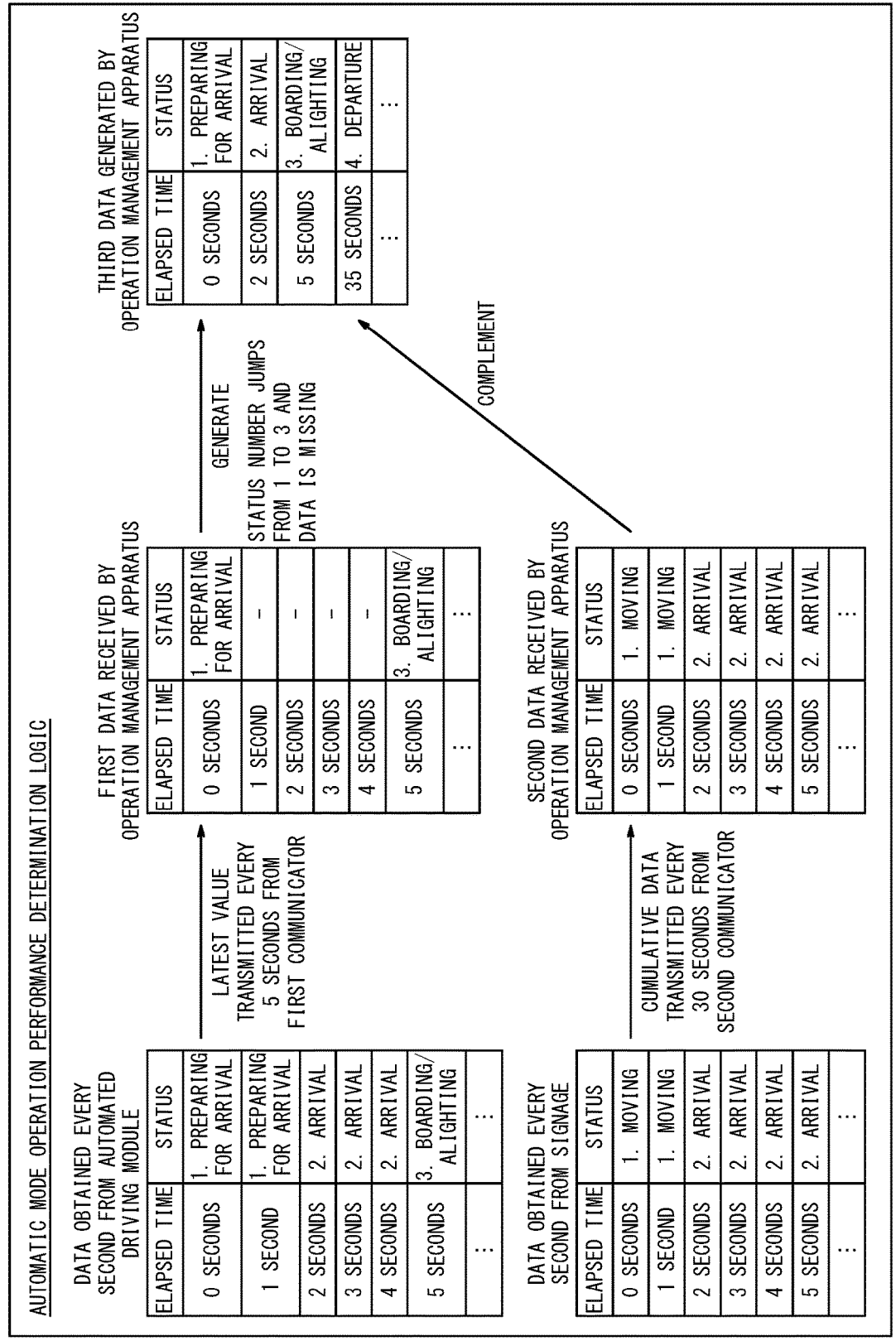
FIG. 4 is a diagram illustrating an example of an automatic mode operation performance determination logic according to the embodiment of the present disclosure.

FIG. 4 illustrates an example of an automatic mode operation performance determination logic according to the present embodiment.

From the automated driving module 31, data including a status number corresponding to one of a "series of operational states" is obtained every second. The "series of operational states" is, in order, "preparing for arrival", "arrival", "boarding/alighting", "departure", . . . . The status numbers "1", "2", "3", "4", . . . correspond to "preparing for arrival", "arrival", "boarding/alighting", "departure", . . . of the "series of operational states", respectively. In the example illustrated in FIG. 4, data obtained from the automated driving module 31 at elapsed times "0 seconds", "1 second", "2 seconds", "3 seconds", "4 seconds", "5 seconds", . . . includes the status numbers "1", "1", "2", "2", "2", "3", . . . respectively.

The first time intervals T1 are 5 seconds. Therefore, the first communicator 33 transmits, every 5 seconds, as first data D1, data including a combination of the most recent elapsed time and the status number most recently obtained from the automated driving module 31. The first communicator 33 may retransmit the data when the data transmission fails. The first communicator 33 does not have to retransmit the data when the data transmission fails twice or more. Instead of having no data assurance, the communication load can be reduced and communication delays are minimized. In the example illustrated in FIG. 4, as the first data D1, data including a combination of the elapsed time "0 seconds" and the status number "1" is transmitted from the first communicator 33. Subsequently, as the first data D1, data including a combination of the elapsed time "5 seconds" and the status number "3" is transmitted from the first communicator 33.

From the signage 32, data including a status number corresponding to one of "two or more types of operational states", which are fewer than the "series of operational states", is obtained every second. The "two or more types of operational states" are, in order, "moving", "arrival", . . . . The status numbers "1", "2", . . . correspond to "moving", "arrival", . . . of the "two or more types of operational states", respectively. In the example illustrated in FIG. 4, data obtained from the signage 32 at elapsed times "0 seconds", "1 second", "2 seconds", "3 seconds", "4 seconds", "5 seconds", . . . includes the status numbers "1", "1", "2", "2", "2", "2", . . . respectively.

The second time intervals T2 are 30 seconds. Therefore, the second communicator 34 transmits, every 30 seconds, as second data D2, data including combinations of each elapsed time in the last 30 seconds and the corresponding status number obtained from the signage 32 in the last 30 seconds. The second communicator 34 may retransmit the data when the data transmission fails. The second communicator 34 may retransmit the data many times until the data transmission is successful. Data assurance allows all data to be accumulated for use in data analysis. In the example illustrated in FIG. 4, as the second data D2, data including combinations of the elapsed times "0 seconds", "1 second", "2 seconds", "3 seconds", "4 seconds", "5 seconds", . . . and the status numbers "1", "1", "2", "2", "2", "2", . . . respectively, is transmitted from the second communicator 34.

In step S1, the controller 21 of the operation management apparatus 20 receives, as first data D1, data including the combination of the elapsed time "0 seconds" and the status number "1" from the first communicator 33 via the communication interface 23. In step S3, the controller 21 determines that the driving mode of the vehicle 30 is the automatic mode. In step S4, the controller 21 generates, as third data D3, data including the combination of the elapsed time "0 seconds" and the status number "1". In step S5, the controller 21 determines that the first data D1 received in step S1 has no missing data. In step S8, the controller 21 stores the third data D3 generated in step S4 in the memory 22 as performance data D5.

Again in step S1, the controller 21 of the operation management apparatus 20 receives, as first data D1, data including the combination of the elapsed time "5 seconds" and the status number "3" from the first communicator 33 via the communication interface 23. In step S3, the controller 21 determines that the driving mode of the vehicle 30 is the automatic mode. In step S4, the controller 21 generates, as third data D3, data including the combination of the elapsed time "5 seconds" and the status number "3". In step S5, the controller 21 determines that the first data D1 received in step S1 has missing data because the status number jumps from "1" to "3". In step S2, the controller 21 receives, via the communication interface 23, as second data D2, data including each of combinations of the elapsed times "0 seconds", "1 second", "2 seconds", "3 seconds", "4 seconds", "5 seconds", . . . and the status numbers "1", "1", "2", "2", "2", "2", . . . , respectively, from the second communicator 34. In step S6, the controller 21 complements the third data D3 by adding, to the third data D3, data including the combination of the elapsed time "2 seconds" and the status number "2", because the earliest elapsed time with the status number "2" is "2 seconds", among the elapsed times "0 seconds", "1 second", "2 seconds", "3 seconds", "4 seconds", "5 seconds", . . . . In this example, the status number "2" in the second data D2 corresponds to the status number "2" in the third data D3. In other words, "arrival" of the "two or more types of operational states" corresponds to "arrival" of the "series of operational states". "Arrival" of the "two or more types of operational states" may also correspond to "boarding/alighting" of the "series of operational states". "Moving" of the "two or more types of operational states" corresponds to "preparing for arrival" of the "series of operational states". "Moving" of the "two or more types of operational states" may also correspond to "departure" of the "series of operational states". For example, assuming that the status number jumps from "1" to "4", the controller 21 may complement the third data D3 by adding, to the third data D3, data including a combination of the elapsed time "3 seconds" and the status number "3", because the earliest elapsed time with the status number "2" is "3 seconds" excluding the elapsed time "2 seconds", out of the elapsed times "0 seconds", "1 second", "2 seconds", "3 seconds", "4 seconds", "5 seconds", . . . . In step S8, the controller 21 stores the third data D3 generated in step S4 and complemented in step S6 in the memory 22 as performance data D5.

Figure 5:
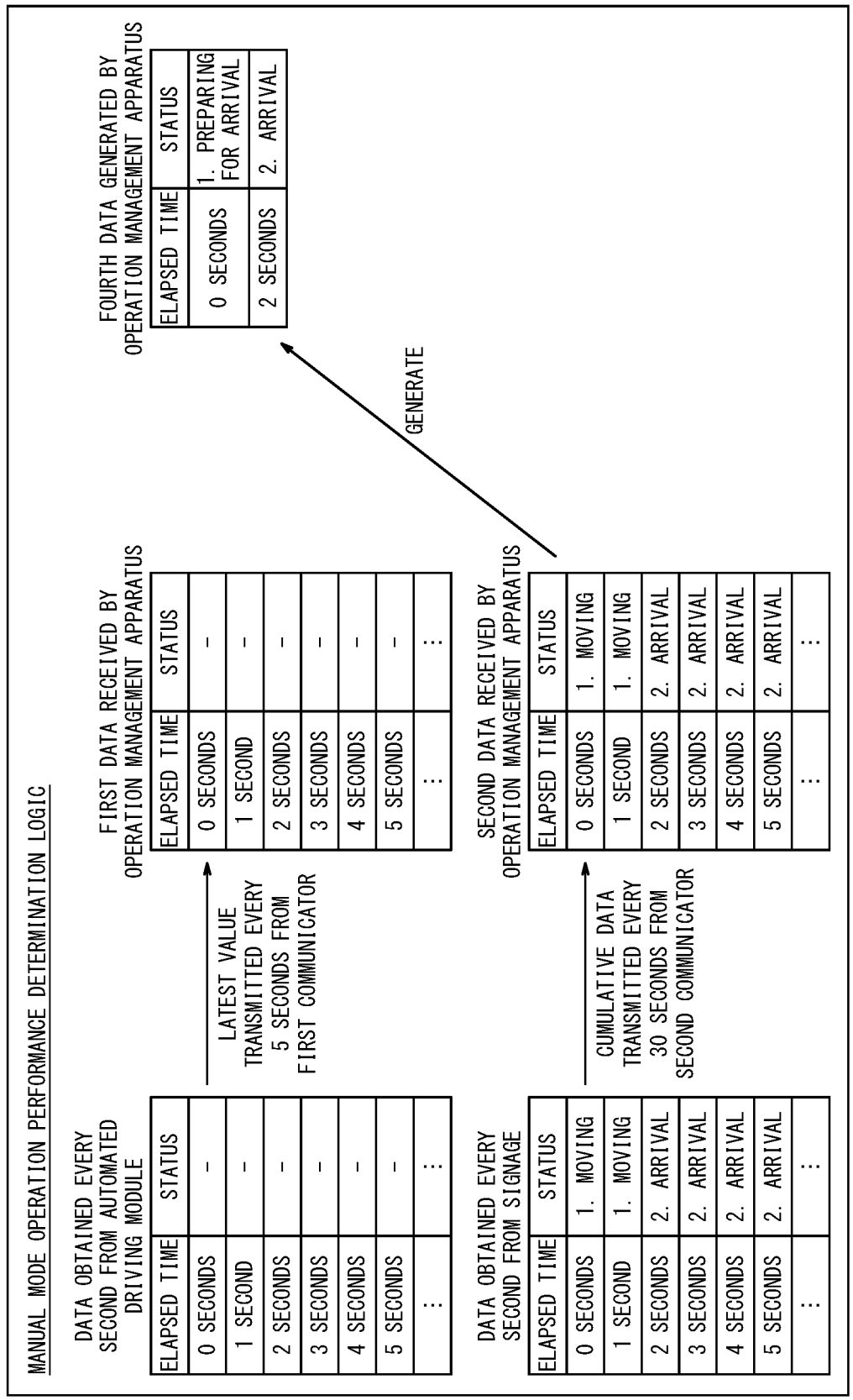
FIG. 5 is a diagram illustrating an example of a manual mode operation performance determination logic according to the embodiment of the present disclosure.

FIG. 5 illustrates an example of a manual mode operation performance determination logic according to the present embodiment.

In the example illustrated in FIG. 5, no data is available from the automated driving module 31. Therefore, first data D1 is not transmitted from the first communicator 33.

In the example illustrated in FIG. 5, the signage 32 provides data similar to the example illustrated in FIG. 4. Therefore, the second communicator 34 transmits the data similar to the example illustrated in FIG. 4, as second data D2.

In step S2, the controller 21 of the operation management apparatus 20 receives, as the second data D2, data including each of combinations of the elapsed times "0 seconds", "1 second", "2 seconds", "3 seconds", "4 seconds", "5 seconds", . . . and the status numbers "1", "1", "2", "2", "2", "2", . . . , respectively, via the communication interface 23 from the second communicator 34. In step S3, the controller 21 determines that the driving mode of the vehicle 30 is the manual mode. In step S7, the controller 21 generates, as fourth data D4, data including combinations of the elapsed times "0 seconds" and "2 seconds" and the status numbers "1" and "2", respectively. In step S8, the controller 21 stores the fourth data D4 generated in step S7 in the memory 22 as performance data D5.

Figure 6:
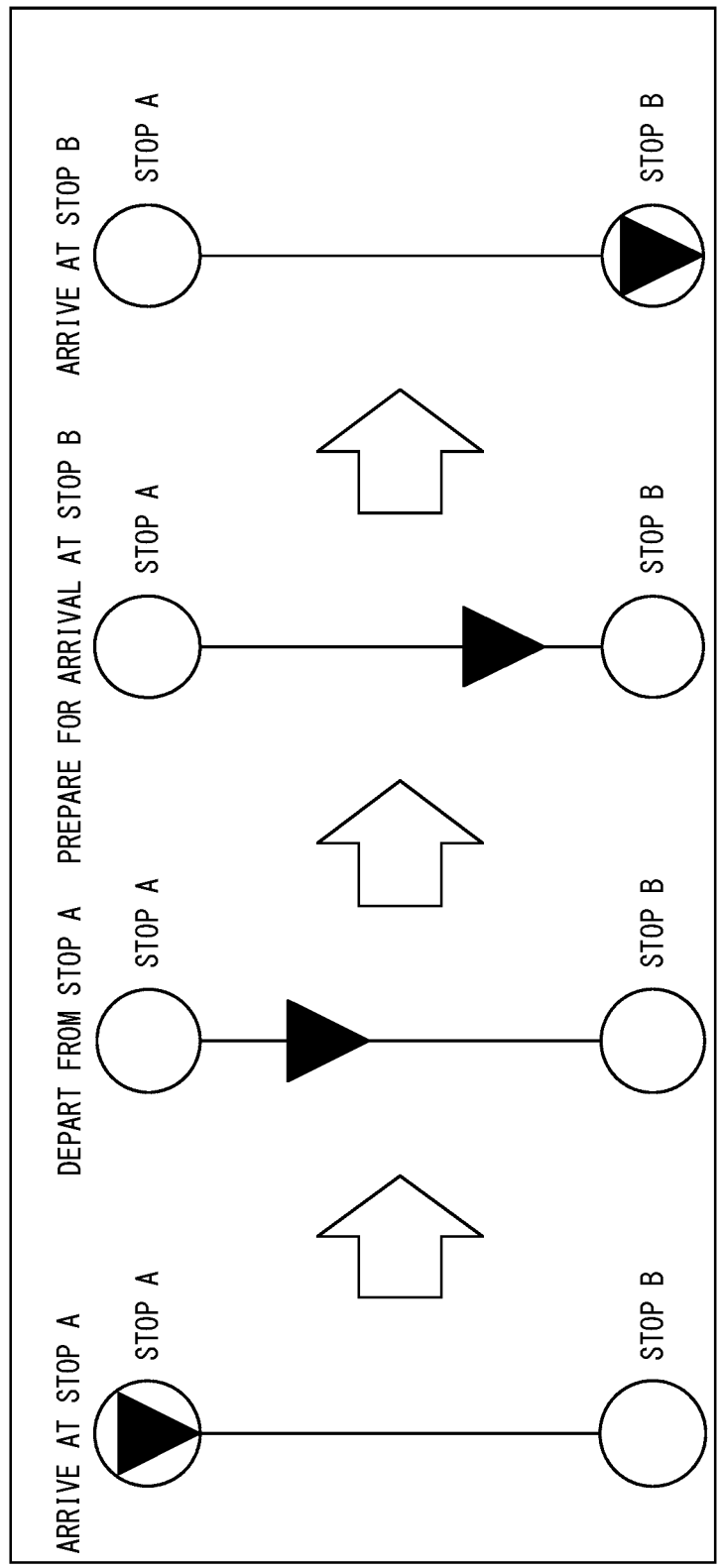
FIG. 6 is a diagram illustrating an example of an operation monitoring screen display according to the embodiment of the present disclosure.

The controller 21 of the operation management apparatus 20 may display the position and status of the vehicle 30 on an operation monitoring screen based on the performance data D5. For example, as illustrated in FIG. 6, each stop is represented by a circle or other symbol on the operation monitoring screen. Stops are connected by straight lines. When the vehicle 30 arrives at a stop A, the text "arrival" in the "series of operational states" is displayed, and a symbol for the vehicle 30, such as a triangle, is displayed above the symbol for the stop A. When the vehicle 30 departs from the stop A, the text "departure" in the "series of operational states" is displayed, and the symbol for the vehicle 30 is displayed close to the stop A on a straight line connecting the stop A to the next stop B. When the vehicle 30 is preparing for arrival at the stop B, the text "preparing for arrival" in the "series of operational states" is displayed, and the symbol for the vehicle 30 is displayed close to the stop B on the straight line connecting the stop A and the stop B. When the vehicle 30 arrives at the stop B, the text "arrival" in the "series of operational states" is displayed, and the symbol for the vehicle 30 is displayed above the symbol for the stop B.

As described above, in the present embodiment, when the vehicle 30 is operated in automated driving, the controller 21 of the operation management apparatus 20 receives both first data D1 and second data D2 and generates third data D3. When the vehicle 30 is operated in manual driving, the controller 21 receives only second data D2, out of first data D1 and the second data D2, and generates fourth data D4 with reference to the received second data D2. According to the present embodiment, when the vehicle 30 is operated in automated driving, it is possible to record operation performance with immediacy, and by complementing missing data, it is also possible to record complete operation performance, just as when the vehicle 30 is operated in manual driving.

According to the present embodiment, it is possible to prevent processing omissions in cases in which special processing is performed upon detection of the arrival of the vehicle 30. For example, it is possible to prevent omission of the process of turning off the display of the route map in the operation monitoring screen after the arrival of the vehicle 30 at the last stop.

According to the present embodiment, the adverse effects of missing data on data analysis can be prevented. For example, reporting omissions can be prevented when a day's operation performance is reported together. Omissions of confirmation of operation performance can be prevented when the operation schedule is revised.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. An operation management apparatus comprising:
a communication interface configured to:
  communicate with an autonomous vehicle to be operated with a passenger on board, the communication interface being remote from the autonomous vehicle;
  enable a remote management of operations of the autonomous vehicle while reducing a communication load, and
a controller configured to:
  determine an operation start time that specifies a time in which the autonomous vehicle performs an action;
  receive, via the communication interface, first data to be transmitted at first time intervals and second data to be transmitted at second time intervals longer than the first time intervals from the autonomous vehicle, the first data indicating an operational state of the autonomous vehicle at a time of transmission of the first data, the second data indicating operational states of the autonomous vehicle at multiple times up to a time of transmission of the second data;
  generate, with reference to the received first data, third data indicating a time at which the autonomous vehicle has transitioned to each of a series of operational states;
  complement the third data with reference to the received second data upon determining that the received first data has missing data indicating at least one of the series of operational states;
  complement the third data by adding, to the third data, data indicating, among the multiple times, an earliest time at which an operational state indicated by the received second data corresponds to the at least one of the series of operational states, as a time at which the autonomous vehicle has transitioned to the at least one of the series of operational states;
  store the third data indicating, among the multiple times, the earliest time at which the operational state indicated by the received second data corresponds to the at least one of the series of operational states, as the time at which the autonomous vehicle has transitioned to the at least one of the series of operational states as performance data; and
  in response to the missing data for operation management being resolved by the complement of the third data, control an automated driving of the autonomous vehicle to move according to the operation start time.

2. The operation management apparatus according to claim 1, wherein
the first data is data indicating the operational state of the autonomous vehicle at the time of the transmission of the first data in one of the series of operational states, and
the second data is data indicating each of the operational states of the autonomous vehicle at the multiple times in one of two or more types of operational states fewer than the series of operational states.

3. The operation management apparatus according to claim 1, wherein the second data is data obtained from a signage mounted on the autonomous vehicle, the signage presenting information to an inside or outside of the autonomous vehicle.

* * * * *